(12) United States Patent
Saito et al.

(10) Patent No.: US 8,307,282 B2
(45) Date of Patent: Nov. 6, 2012

(54) CHARACTER STRING DISPLAY SYSTEM, CHARACTER STRING DISPLAY METHOD, AND STORAGE MEDIUM

(75) Inventors: Mikio Saito, Tokyo (JP); Takao Yamagishi, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 2144 days.

(21) Appl. No.: 11/071,230

(22) Filed: Mar. 4, 2005

(65) Prior Publication Data

US 2005/0195218 A1   Sep. 8, 2005

(30) Foreign Application Priority Data

Mar. 5, 2004   (JP) .................................. 2004-063158

(51) Int. Cl.
*G06F 17/00* (2006.01)
(52) U.S. Cl. ........................ 715/273; 715/255
(58) Field of Classification Search .................. 715/500, 715/511, 512, 526, 530, 200, 229, 230, 255, 715/273
See application file for complete search history.

(56) References Cited

U.S. PATENT DOCUMENTS

| | | | | |
|---|---|---|---|---|
| 5,388,993 | A * | 2/1995 | McKiel et al. | 434/118 |
| 6,067,069 | A * | 5/2000 | Krause | 345/685 |
| 6,130,968 | A | 10/2000 | McIan et al. | |
| 6,515,690 | B1 * | 2/2003 | Back et al. | 715/866 |
| 6,925,613 | B2 * | 8/2005 | Gibson | 715/864 |
| 6,931,587 | B1 * | 8/2005 | Krause | 715/500 |
| 2002/0156804 | A1 * | 10/2002 | Janakiraman et al. | 707/500.1 |
| 2003/0043196 | A1 * | 3/2003 | Gibson | 345/776 |
| 2004/0036714 | A1 | 2/2004 | Blakely et al. | |

FOREIGN PATENT DOCUMENTS

| | | |
|---|---|---|
| JP | 2001-272967 A | 10/2001 |
| JP | 2003-144758 A | 5/2003 |
| TW | 523714 | 3/2003 |
| WO | WO 98/06082 A1 | 2/1998 |
| WO | WO 02/37256 A3 | 5/2002 |

* cited by examiner

*Primary Examiner* — Stephen Hong
*Assistant Examiner* — Gregory J Vaughn
(74) *Attorney, Agent, or Firm* — Sughrue Mion, PLLC

(57) ABSTRACT

It is an object of the invention to provide a character string display system, a character string display method, and a storage medium that can determine a display time according to character string display times in the past to thereby determine a display time corresponding to speed of reading and understanding a character string of an individual who reads the character string. The character string display system is characterized by including: a display time determining unit for determining a display time for a display character string on the basis of a reference value; a display unit for displaying the display character string for the display time determined by the display time determining unit; an operation unit for detecting predetermined operation performed by an operator while the display unit displays the display character string; and a reference value changing unit that, when the operation unit detects operation of the operator, extends or reduces a time, during which the display unit displays the display character string, and changes the reference value according to the extension or the reduction of the time for displaying the display character string.

10 Claims, 12 Drawing Sheets

FIG. 7

| CHARACTER READING AMOUNT |
|---|
| — — — |
| — — — |
| — — — |
| — — — |

FIG. 8

| DIFFERENCE |
|---|
| — — — |
| — — — |
| — — — |
| — — — |

FIG. 9

| LENGTH OF WORD | WEIGHTING FACTOR |
|---|---|
| 1 | 1 |
| 2 | 1.1 |
| 3 | 1.2 |
| ⋮ | ⋮ |

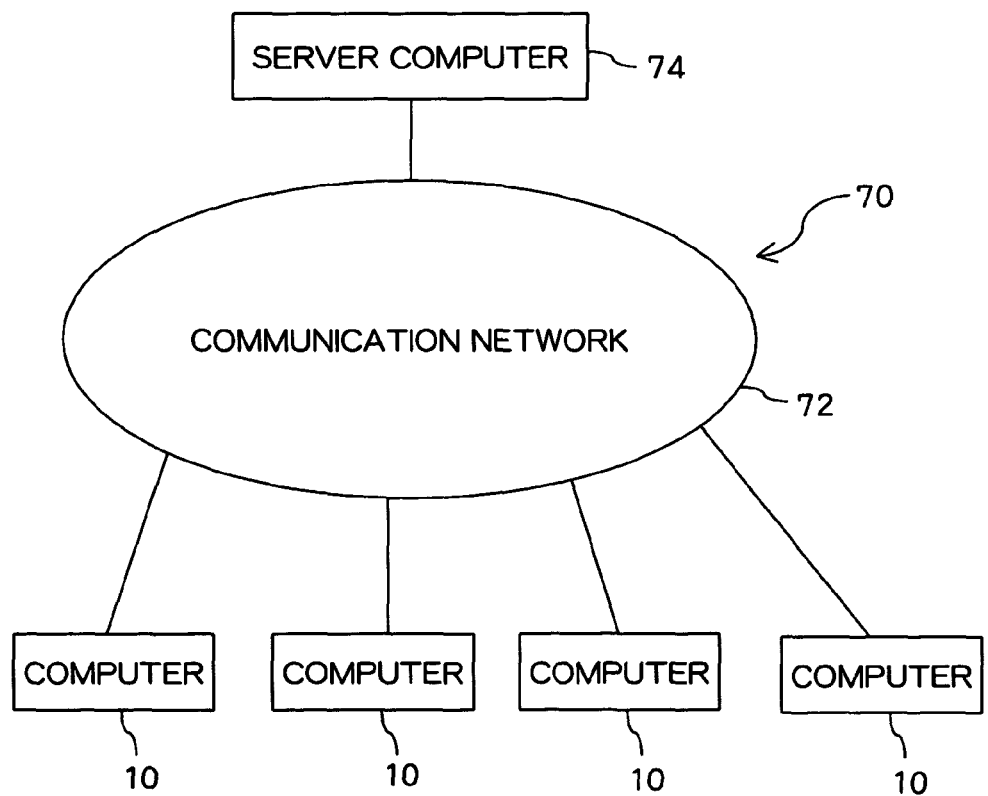

CHARACTER STRING DISPLAY SYSTEM, CHARACTER STRING DISPLAY METHOD, AND STORAGE MEDIUM

BACKGROUND OF THE INVENTION

The present invention relates to a character string display system, a character string display method, and a storage medium, and in particular to a technique for controlling a display time for a character string.

A system for displaying a character string in a computer is frequently used as a type of human machine interface (HMI). Such a system for displaying a character string is often constituted to display a character string for a fixed time and, then, erase the character string from a screen of a computer.

In such a character string display system, a display time for a character string is never changed depending on a content of the character string but is displayed for a predetermined display time. Thus, a person reading the character string has problems. For example, the character string may disappear before the person finishes reading it. Conversely, the person often gets bored because a display time for the character string is too long.

In this regard, JP-A-2003-144758 discloses an invention for displaying a message character string for a display time determined on the basis of the message character string to be displayed.

However, in the invention disclosed in JP-A-2003-144758, a display time is determined according to a content of the character string and, regardless of who reads the character string, the character string is displayed in the same display time in all computers that display the character string. Therefore, the display time for the character string is not a display time corresponding to an individual difference in speed for reading the character string. In other words, there is a problem in that a display time is not determined according to speed of reading and understanding a character string of an individual who reads the character string.

SUMMARY OF THE INVENTION

The invention has been devised in view of the actual situation described above and it is an object of the invention to provide a character string display system, a character string display method, and a storage medium that can determine a display time according to character string display times in the past to thereby determine a display time corresponding to speed of reading and understanding a character string of an individual who reads the character string.

In order to solve the problems, the invention provides a character string display system characterized by including: a reference value storing unit for storing a reference value for determining display time for character string; a display character string acquiring unit for acquiring a display character string; a display character string display time determining unit for determining a display time for the display character string on the basis of the reference value stored by the reference value storing unit; a display character string display unit for displaying the display character string for the display time determined by the display character string display time determining unit; an operation detecting unit for detecting a predetermined operation performed by an operator while the display character string display unit displays the display character string; a display character string display time extending/reducing unit for extending or reducing a time, during which the display character string display unit displays the display character string, when the operation detecting unit detects the predetermined operation by the operator; and a reference value changing unit for changing the reference value stored by the reference value storing unit according to the extension or reduction of the time for displaying the display character string by the character string display time extending/reducing unit.

With such a constitution, the time for displaying the display character string can be extended or reduced when the operation by the operator is detected, and the reference value can be changed according to the extension or reduction of the time for displaying the display character string. Consequently, it is possible to set the time for displaying the character string from the next time to a display time corresponding to speed of reading and understanding the character string of an individual who reads the character string.

In the character string display system, it is also possible that, when the operation detecting unit detects the predetermined operation by the operator, the display character string display time extending/reducing unit extends or reduces the time, during which the display character string display unit displays the display character string, according to a content of the operation by the operator.

With such a constitution, the reference value can be changed according to the content of operation by the operator. Consequently, it is possible to set the time for displaying the character string from the next time to a display time corresponding to speed of reading and understanding the character string of the individual who reads the character string.

In the character string display system, it is also possible that, when the operation detecting unit detects depression of a predetermined button, the display character string display time extending/reducing unit restricts a stop of display and, when the operation detecting unit detects release of the predetermined button, the display character string display time extending/reducing unit stops the display to thereby extend or reduce the time during which the display character string display unit displays the display character string.

With such a constitution, both the restriction of the stop of display and the stop of the display can be realized by the operation of the same button. Consequently, it is possible to realize an interface that a user can operate easily.

In the character string display system, it is also possible that the character string display system further includes an extended/reduced time data storing unit for storing data corresponding to the display time extended or reduced by the display character string display time extending/reducing unit, and the reference value changing unit changes the reference value stored by the reference value storing unit on the basis of the data stored by the extended/reduced time data storing unit.

In the character string display system, it is also possible that the character string display system further includes a character reading amount determining unit for determining a character reading amount of the display character string, the reference value is a display time for the display character string per the character reading amount, the display character string display time determining unit determines the display time on the basis of the reference value stored by the reference value storing unit and the character reading amount, and the reference value changing unit changes the reference value stored by the reference value storing unit on the basis of the data stored by the extended/reduced time data storing unit and the character reading amount.

With such a constitution, the reference value can be changed on the basis of the character reading amount of the character string and data corresponding to the extended or reduced display time. Consequently, it is possible to determine the display time corresponding to speed of reading and understanding the character string of the individual, who reads the character string, taking into account not only operation by the operator but also the character reading amount of the character string.

In the character string display system, it is also possible that the character reading amount determining unit determines the character reading amount on the basis of lengths of words or/and the number of the words included in the display character string or determines the character reading amount on the basis of the number of characters for each character type included in the display character string or the number of continuations for each continuation of the character type.

A character string display method in accordance with the invention is characterized by including: a step in which a display character string acquiring unit acquires a display character string; a step in which a display character string display time determining unit determines a display time for the display character string on the basis of a reference value stored in a reference value storing unit for storing a reference value for determining display time for character string; a step in which a display character string display unit displays the display character string for the display time determined by the display character string display time determining unit; a step in which an operation detecting unit detects predetermined operation performed by an operator while the display character string display unit displays the display character string; a step in which a display character string display time extending/reducing unit extends or reduces a time, during which the display character string display unit displays the display character string, when the operation detecting unit detects the predetermined operation by the operator; and a step in which a reference value changing unit changes the reference value stored in the reference value storing unit according to the extension or reduction of the time for displaying the display character string by the character string display time extending/reducing unit.

A storage medium in accordance with the invention is characterized by being a computer readable storage medium having stored therein a program for causing a computer to function as: a reference value storing unit for storing a reference value for determining display time for a character string; a display character string acquiring unit for acquiring a display character string; a display character string display time determining unit for determining a display time for the display character string on the basis of the reference value stored by the reference value storing unit; a display character string display unit for displaying the display character string for the display time determined by the display character string display time determining unit; an operation detecting unit for detecting predetermined operation performed by an operator while the display character string display unit displays the display character string; a display character string display time extending/reducing unit for extending or reducing a time, during which the display character string display unit displays the display character string, when the operation detecting unit detects the predetermined operation by the operator; and a reference value changing unit for changing the reference value stored in the reference value storing unit according to the extension or reduction of the time for displaying the display character string by the character string display time extending/reducing unit.

BRIEF DESCRIPTION OF THE DRAWINGS

In the accompanying drawings:

FIG. 7 is a diagram showing an example of a storage table of character reading amounts;

FIG. 8 is a diagram showing an example of a storage table of differences between a time, during which a character string is actually displayed, and a display time determined by a display time determining unit;

FIG. 9 is a diagram showing an example of a storage table of weighting factors for each length of a word;

FIG. 13 is a diagram showing an example of a storage table of weighting factors for each character type or continuation of a character type;

FIG. 14 is a diagram showing an example of an overall structure of a character string display system;

DESCRIPTION OF THE PREFERRED EMBODIMENTS

Embodiments of the invention will be hereinafter described in detail with reference to the accompanying drawings.

Figure 1:
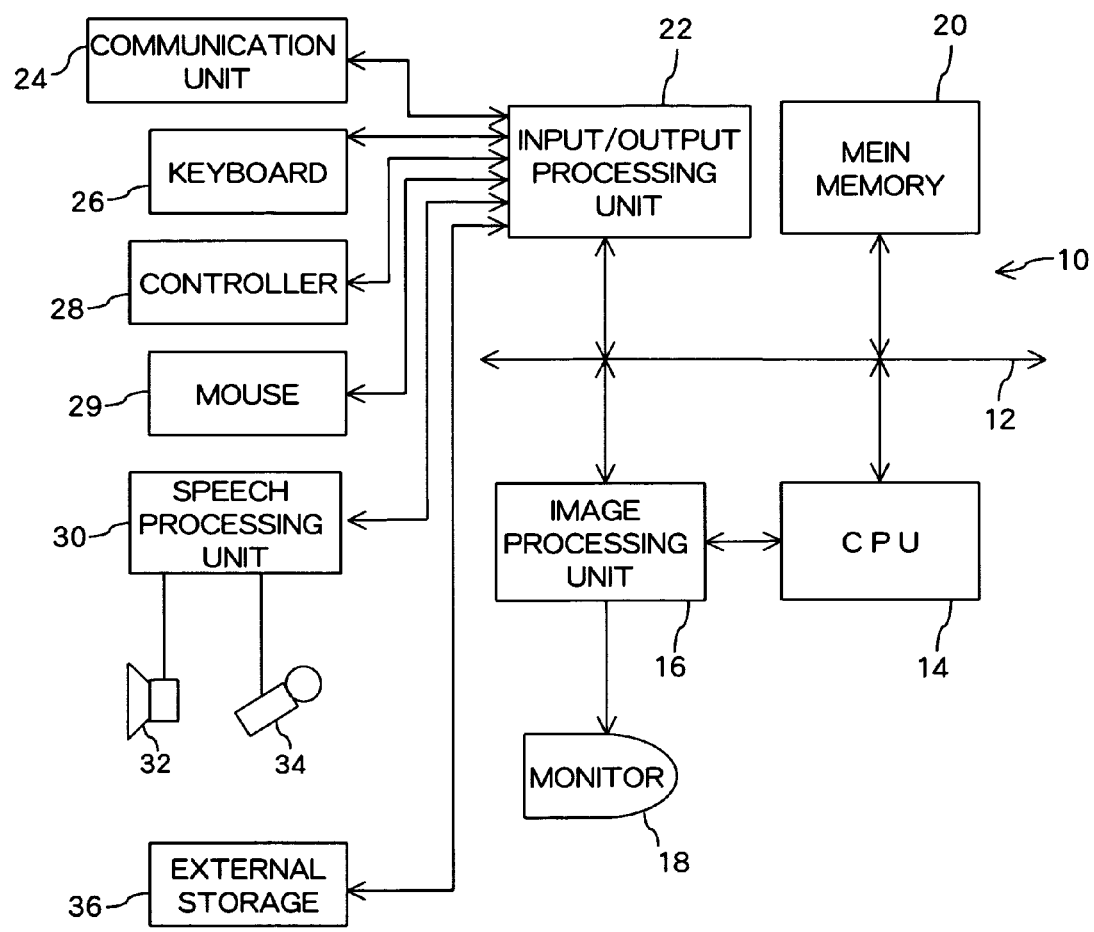
FIG. 1 is a hardware diagram showing a computer.

FIG. 1 is a hardware diagram of a computer 10 used in the embodiments of the invention. This computer 10 is used as a character string display system in an embodiment of the invention. The computer 10 is a general purpose or dedicated information processing apparatus. More specifically, examples of the computer 10 include a personal computer, a game terminal, a cellular phone, a personal digital assistant, an electronic sign board, or personal digital electronics publicly known in the related art. As shown in the figure, the computer 10 includes a CPU 14, an image processing unit 16, a main memory 20, an input/output processing unit 22. These components are connected to one another via a bus 12. A communication unit 24, a keyboard 26, a controller 28, a mouse 29, a speech processing unit 30, and an external storage 36 are connected to the input/output processing unit 22. A monitor 18 is connected to the image processing unit 16. In addition, a speaker 32 and a microphone 34 are connected to the speech processing unit 30.

In the external storage 36, it is possible to use a flexible disk, a CD-ROM, a CD-RW, a DVD-RAM, a USB flash memory, a ROM card, a removable hard disk, and the like. In other words, it is possible to use all sorts of computer readable information storages. The external storage 36 stores computer programs and data.

Figure 2:
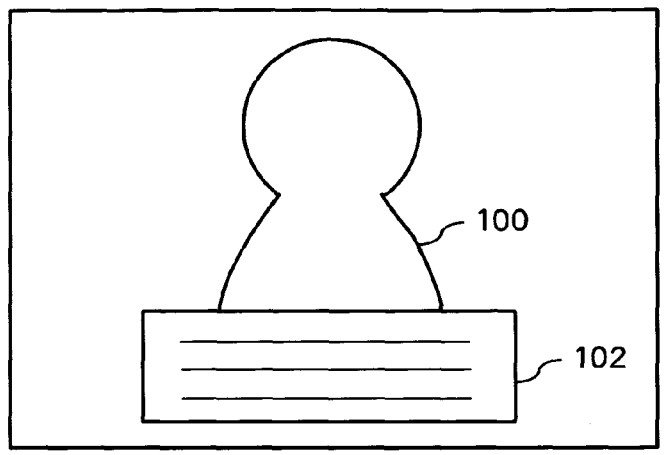
FIG. 2 is an example of a screen displayed on a display of the computer.

FIG. 2 shows an example of a screen displayed on the monitor 18 of the computer 10. The figure shows a screen displayed when the computer 10 is used as a system for making interaction between the computer 10 and a user of the computer 10 (an interactive interface) possible by displaying a character string obtained by the computer 10 on the monitor 18. In this embodiment, it is possible to appropriately determine a display time, during which a character string to be used in the interaction is displayed, according to a content of the character string. Consequently, the user of the computer 10 can read character strings, which are sequentially displayed on the screen of the computer 10, free from care. More specifically, for example, an interactive game is played on the computer 10. In the interactive game shown in the figure, character strings displayed by the computer 10 are sequentially displayed as lines 102 of a character 100 displayed on a game screen. In such a case, the user of the computer 10 can read the lines free of care.

Figure 3:
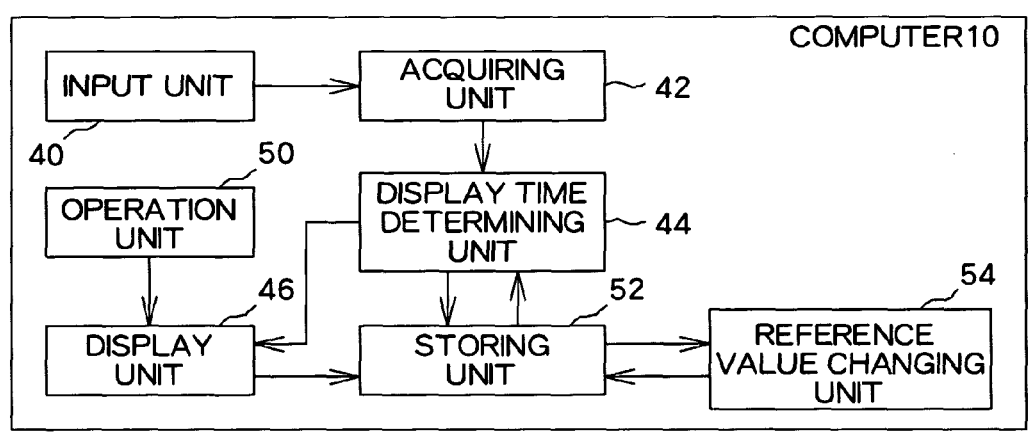
FIG. 3 is an example of a block diagram of a structure of the computer.

Next, FIG. 3 shows a functional block diagram in the computer 10 used in this embodiment. The computer 10 includes an input unit 40, an acquiring unit 42, a display time determining unit 44, a display unit 46, an operation unit 50, a storing unit 52, and a reference value changing unit 54. These components are realized when a predetermined program is executed in the computer 10. The program is stored in, for example, the information storage medium described above and is read out by the external storage 36.

The input unit 40 reads out a character string and inputs the character string to the acquiring unit 42. The character string is constituted by one or more characters. More specifically, for example, the character string may be described in a computer program such as a game program in advance or may be stored in various storage media, the main memory 20, and the like as a database or a table. The computer 10 is constituted to read out the character string in accordance with the description of the computer program.

The acquiring unit 42 acquires a display character string constituted by one or more characters for display on the basis of the character string inputted from the input unit 40 and passes the display character string to the display time determining unit 44. The display character string is a character string displayed at a time. The display character string is acquired on the basis of the character string inputted from the input unit 40. For example, the display character string includes the entire character string or a part of the character string inputted from the input unit 40. Note that the character string constituting the display character string does not have to be inputted from the input unit 40 at one time but may be inputted over the course of a number of times. When the character string is inputted over the course of a number of times, the acquiring unit 42 stores the inputted character strings in the main memory 20 or the like and couples the character strings to thereby acquire the display character string.

The display time determining unit 44 reads out a reference value stored in the storing unit 52. The reference value is used for determining display time for a character string. In particular, here, the reference value is set as a display time per character reading amount to be described later. The display time determining unit 44 determines a character reading amount of a display character string on the basis of a content of a character string included in the display character string. Then the display time determining unit 44 determines a display time for the display character string on the basis of the read-out reference value and the determined character reading amount and writes the determined character reading amount in the storing unit 52. More specifically, the display time determining unit 44 determines a display time for the display character string by multiplying the reference value stored in the storing unit 52 by the determined character reading amount. More specific processing of the display time determining unit 44 will be described later.

The display unit 46 displays the display character string on the monitor 18 or the like for the display time determined by the display time determining unit 44. More specifically, when the character string and the display time are passed from the display time determining unit 44, the display unit 46 displays the display character string on the monitor 18 or the like for the display time. Simultaneously with the elapse of the display time, the display time determining unit 44 erases the display character string from the monitor 18. Note that, as a method of watching the elapse of the display time, the display unit 46 may start time counting simultaneously with a start of display and watch whether the display time elapses. Alternatively, the display unit 46 may calculate a difference between display start time and present time to thereby watch the elapse of the display time. When the display character string is displayed on the monitor 18, the display unit 46 can also display a guidance indication image such as a cursor or an icon for facilitating the operator to perform operation.

The operation unit 50 detects operation by the operator and passes a content of the detected operation to the display unit 46. The display unit 46 extends or reduces a time, during which the display character string is displayed, according to the content of the operation performed by the operator. Then, the display unit 46 writes data corresponding to the extended or reduced display time in the storing unit 52. Here, the data corresponding to the extended or reduced display time may be a difference between the actual extended or reduced display time and the display time determined by the display time determining unit 44 or may be the actual extended or reduced display time itself. More specifically, the operation by the operator detected by the operation unit 50 may be depression or release of the predetermined button of the controller 28 during display of the display character string.

The display unit 46 extends or reduces a time, during which the display character string is displayed, according to the content of the operation detected by the operation unit 50. More specifically, for example, when the operator depresses a round button (a predetermined press button) of the controller 28 while the display character string is displayed, the display unit 46 stops watching for the elapse of the display time for the display character string. Then, the display unit 46 continues to display the display character string until the round button of the controller 28 is released. In other words, when the operator releases the round button of the controller 28, the display unit 46 erases the display character string from the monitor 18. Then, the display unit 46 performs processing for calculating a difference between the display time determined by the display time determining unit 44 and a time, during which the display character string has been actually displayed, and writes the difference in the storing unit 52.

The storing unit 52 stores the reference value, the character reading amount, and the data corresponding to the extended or reduced display time. In addition, the storing unit 52 stores a weighting factor for each length of a word (number of characters) in a first embodiment to be described later and a weighting factor for each character type or continuation of a character type in a second embodiment to be described later. Note that the storing unit 52 can also store a difference between the display time determined by the display time determining unit 44 and the time, during which the display character string has been actually displayed, as data corresponding to the extended or reduced display time (actual display time data). The reference value is one numeral, and the character reading amount, the difference, the weighting factor for each length of a word, and the weighting factor for each character type or continuation of a character type are stored in the storing unit 52, which is constituted by the main memory 20 etc., as tables as illustrated in FIGS. 7 to 9 and FIG. 13. In the table of character reading amounts shown in FIG. 7, one or more character reading amounts, which are calculated every time the display character string is displayed, are stored. The character reading amounts are read out by the reference value changing unit 54. In addition, in the table of data (data corresponding to the extended or reduced display time) shown in FIG. 8, here, one or more data are stored as differences between the display time determined by the display time determining unit 44 and the time during which the display character string has been actually displayed. The differences are read out by the reference value changing unit 54. FIGS. 9 and 13 will be described later.

The reference value changing unit 54 reads out the character reading amounts and the data corresponding to the extended or reduced display time that are stored in the storing unit 52. Then, the reference value changing unit 54 changes the reference value stored in the storing unit 52 on the basis of the data corresponding to the extended or reduced display time and the character reading amounts. More specifically, for example, the storing unit 52 stores differences between display times determined by the display time determining unit 44 and times, during which the display character string has been actually displayed, and character reading amounts for a predetermined number of times of display, respectively. Then, the reference value changing unit 54 divides an average value of the differences between times, during which the display character string has been actually displayed, and display times determined by the display time determining unit 44 for the predetermined number of times of display by a sum of the character reading amounts for the predetermined number of times of display to thereby calculate a correction value of the reference value. The correction value is a value for changing the reference value by increasing or decreasing the reference value. Then, the reference value changing unit 54 adds the correction value to the reference value stored in the storing unit 52 to thereby change the reference value.

First Embodiment

Processing of a character string display system in accordance with a first embodiment of the invention will be hereinafter described.

A character reading amount of a character string in the first embodiment is determined in the display time determining unit 44 according to calculation based on the numbers of characters included in respective words. Moreover, in determining the character reading amount, the display time determining unit 44 uses weighting factors associated with lengths (the numbers of characters) of words, reads out weighting factors corresponding to the respective words, and determines the character reading amount using the read out weighting factors. More specifically, the display time determining unit 44 multiplies the numbers of words included in the respective words by weighting factors, which are stored in the storing unit 52 in association with the numbers of characters of the respective words, to thereby calculate character reading amounts of the respective words and set a total of the character reading amounts as a character reading amount of the character string.

An example of a table storing weighting factors is a table shown in FIG. 9. In the table shown in FIG. 9, the weighting factors are stored in association with lengths (the numbers of characters) of words. The display time determining unit 44 reads out a weighting factor associated with a length of a word with the length of the word as a key.

The display time determining unit 44 determines a display time for a display character string on the basis of a reference value stored in the storing unit 52 and the determined character reading amount. The display time determining unit 44 also writes the determined character reading amount in the storing unit 52. More specifically, the display time determining unit 44 multiplies the reference value stored in the storing unit 52 by the character reading amount to thereby determine a display time for the display character string.

Figure 5:
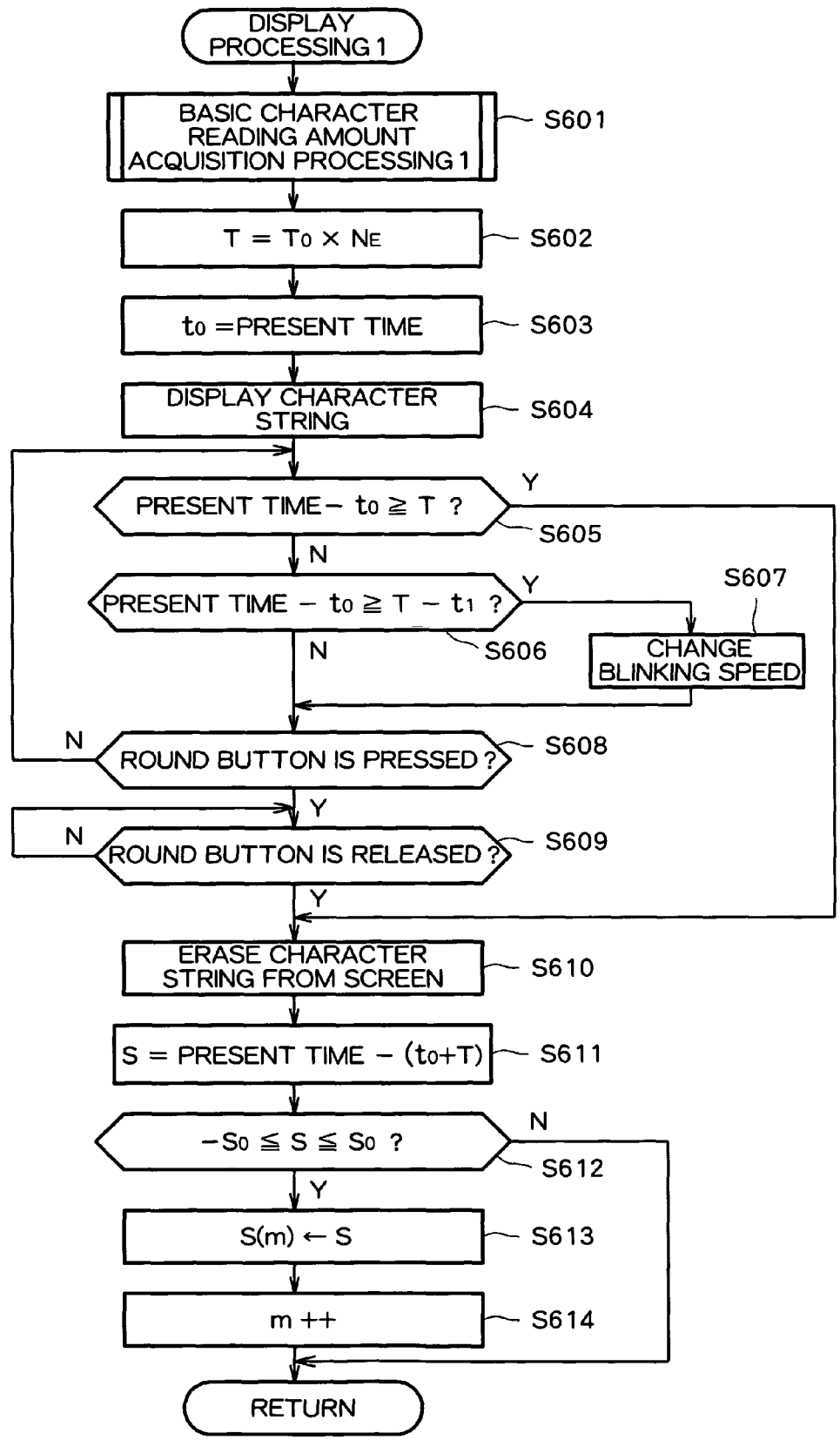
FIG. 5 is another example of a flow diagram of the computer processing.
Figure 6:
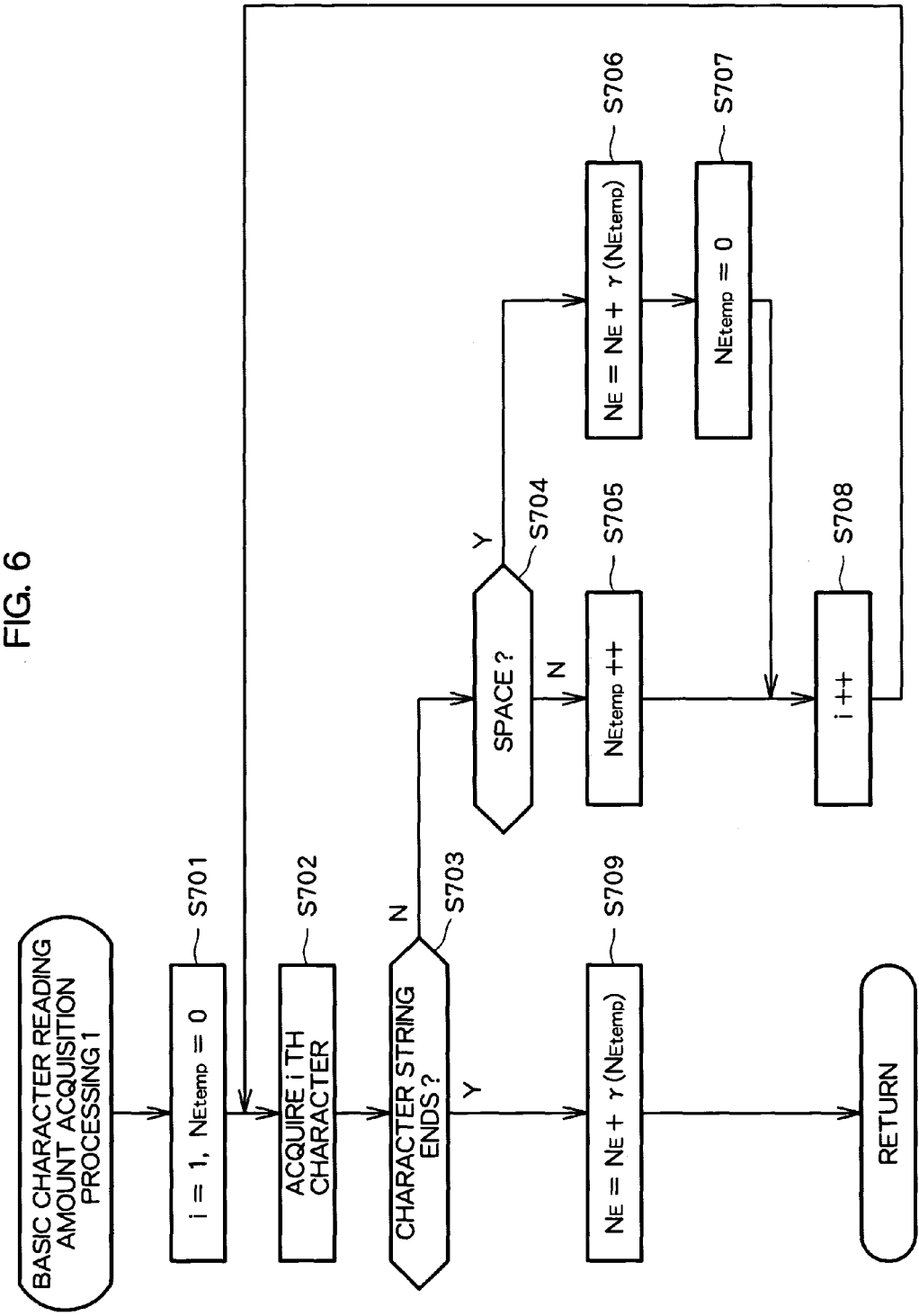
FIG. 6 is a further example of a flow diagram of the computer processing.

The processing will be described more specifically on the basis of flow diagrams shown in FIGS. 4 to 6. In the figure, a character string is described as an English sentence. However, the processing is applicable to any character string as long as the character string is divided into words by a predetermined character like a space (other than the English sentence, the processing is applicable to sentences in various languages such as French, Spanish, and Russian).

Figure 4:
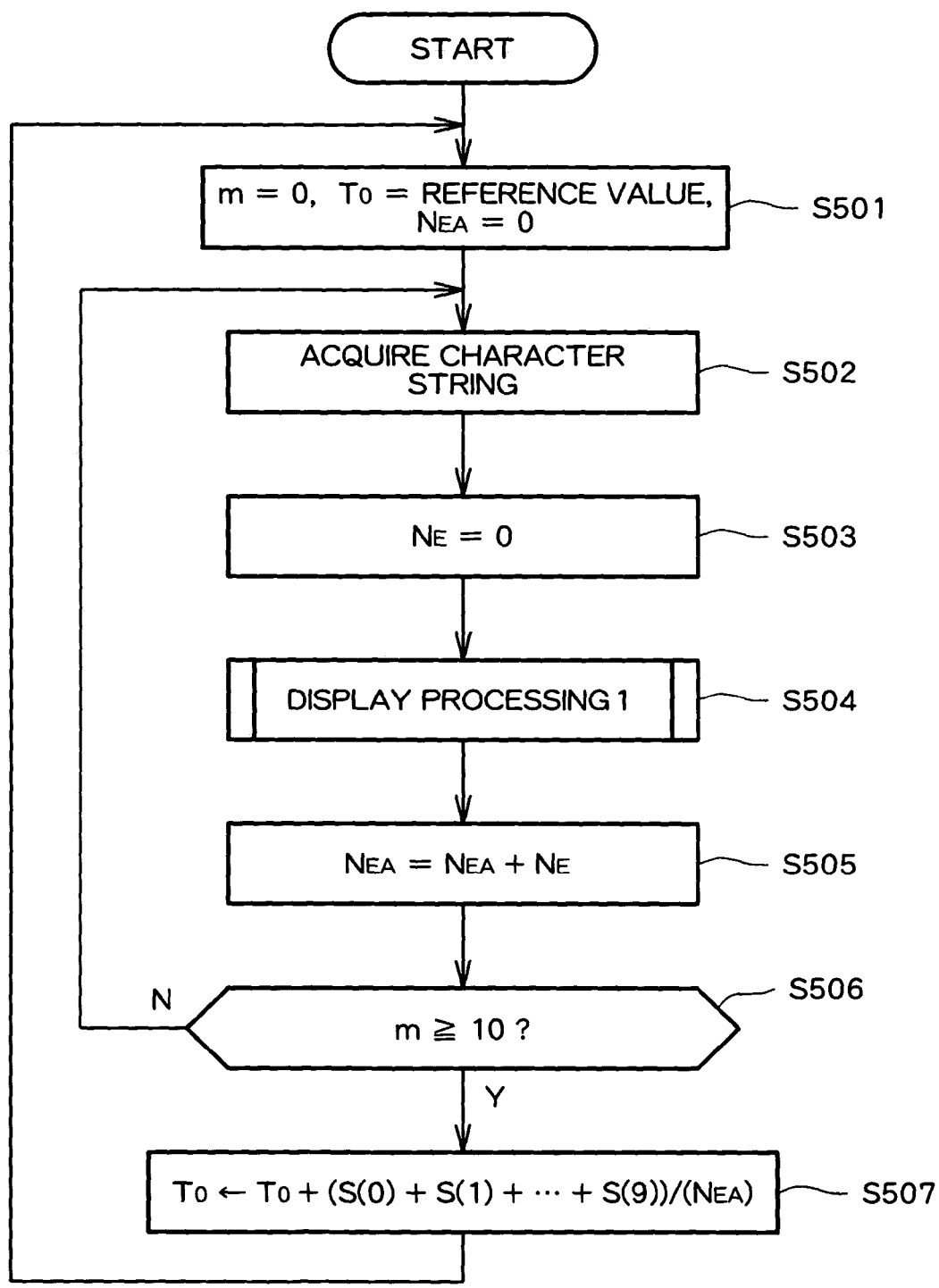
FIG. 4 is an example of a flow diagram of the computer processing.

In the processing shown in FIG. 4, first, the character string display system secures storage areas for variables m, $T_0$, and $N_{EA}$ and sets respective values of the variables to a reference value 0, reference value, 0 (S501). Next, the character string display system acquires a display character (S502). Then, the character string display system secures a storage area for a variable $N_E$ representing a basic character reading amount of a character string and sets a value of the variable to 0 (S503). Then, the character string display system performs processing for display of the display character string (S504). This processing in S504 is processing shown in FIG. 5, which will be described later. Then, the character string display system adds $N_E$ determined in the processing in S504 to $N_{EA}$ (S505). If m does not exceed 10 (No in S506), the character string display system returns to S502 and, if m is 10 or more (Yes in S506), the character string display system divides a sum of S(n) by a sum of character reading amounts indicated by the following expression (1) (n is an integer equal to or larger than 0). Note that, in the first embodiment, the sum R of the character reading amounts is equal to the variable $N_E$ representing the basic character reading amount.

$$R = N_{EA} \qquad (1)$$

Then, the character string display system adds a value obtained by dividing the sum of S(n) by R to $T_0$ (S507). In order to display the next display character string, the character string display system returns to the start. In this way, the character string display system can determine a display time according to character string display times in the past by updating the reference value $T_0$.

Next, the processing shown in FIG. 5 will be described in detail. FIG. 5 is a flow diagram specifically showing the processing in S504 in FIG. 4. In the figure, first, the character string display system acquires a basic character reading amount of a display character string (S601). This processing in S601 is processing shown in FIG. 6, which will be described later. Then, the character string display system secures a storage area for T and substitutes a value indicated in the following expression (2) in T (S602).

$$T = T_0 \times N_E \qquad (2)$$

Next, the character string display system secures a storage area for $t_0$ and substitutes present time in $t_0$ (S603). Then, the character string display system displays the display character string on the monitor 18 or the like (S604). Next, the character string display system judges whether a difference between the present time and to is T or more (S605). If the difference is T or more, the character string display system erases the display character string from a screen on the monitor 18 or the like (S610). On the other hand, if the difference is not T or more, the character string display system judges whether the difference between the present time and $t_0$ is $T-t_1$ or more (S606). Here, $t_1$ is a constant defined separately in advance. If the difference between the present time and $t_0$ is $T-t_1$ or more, the character string display system changes blinking speed of a cursor displayed together with the display character string (S607). According to this processing, the character string display system can inform a person reading the display character string that the display will end soon. Then, the character string display system proceeds to processing in S608. On the other hand, if the difference between the present time and $t_0$ is not $T-t_1$ or more, the character string display system does not perform the processing in S607 and proceeds to the processing in S608. In S608, the character string display system judges whether the round button is pressed by the operator and, if the round button is not pressed, returns to S605. On the other hand, if the round button is pressed, the character string display system judges whether the round button is released by the operator (S609). Then, the character string display system repeats the processing in S609 until it is judged that the round button is released. In short, the character string display system restricts a stop of the display. In other words, the character string display system restrains the display from stopping or extends the display until the round button is released. If it is judged that the round button is released, the character string display system proceeds to processing in S610. In S611, the character string display system secures a storage area for a variable S and substitutes a value obtained by subtracting a sum of $t_0$ and T from the present time in S (S611). If S is between $-S_0$ and $S_0$ (Yes in S612), the character string display system substitutes S in a column m of an array S(n) (S613) and increments m (S614). On the other hand, if S is not between $-S_0$ and $S_0$ (No in S612), the character string display system ends the processing and returns to the processing in FIG. 4. Note that $S_0$ is a constant defined separately in advance and is a threshold value for, when there is an abnormal value in actual display data, excluding the abnormal value from determination of a display time. In addition, S is actual display time data and S(n) is an array consisting of S stored every time a character string is displayed. According to the processing described above, the character string display system can reflect display times for display character strings in the past on the variable S. Consequently, by performing the calculation processing as indicated in S507 in FIG. 4, the character string display system can reflect the display times for the display character strings in the past on a reference value.

Next, processing shown in FIG. 6 will be described in detail. FIG. 6 is a flow diagram specifically showing the processing for acquiring a basic character reading amount in S601 in FIG. 5. In the figure, first, the character string display system secures storage areas for variables i and $N_{Etemp}$ and substitutes 0 in the respective values (S701). Then, the character string display system acquires an ith character of the display character string (S702). If the character has not been successfully acquired, the character string display system considers that the character string ends (S703), ends the processing, performs processing (to be described later) in S709, and returns to the processing in FIG. 5. On the other hand, if the character has been successfully acquired, the character string display system judges whether the character is a space (S704). If the character is not a space, the character string display system increments $N_{Etemp}$ (S705), increments i, returns to the processing in S702, and acquires the next character. On the other hand, if the character is a space, the character string display system calculates $\gamma(N_{Etemp})$ and adds $\gamma(N_{Etemp})$ to the basic character reading amount $N_E$ (S706). Here, $\gamma(N_{Etemp})$ is a weighting factor associated with a length of a word $N_{Etemp}$ and is stored in the table shown in FIG. 9 in association with $N_{Etemp}$. Note that, although the length of a word and the weighting factor are stored in association with each other, the weighting factor may be calculated by substituting $N_{Etemp}$ in a predetermined function $\gamma$. Then, the character string display system substitutes 0 in $N_{Etemp}$, further increments i, returns to the processing in S702, and acquires the next character.

Processing in the case in which it is judged in S703 that the character string ends will be described. In this case, it is necessary to add a weighting factor corresponding to a length of a last word included in the display character string to the basic character reading amount $N_E$. Thus, as in the processing in S706, the character string display system adds the weighting factor $\gamma(N_{Etemp})$ corresponding to the length of the last word included in the display character string to the basic character reading amount $N_E$ (S709). Then, the character string display system returns to the processing in FIG. 5.

According to this embodiment, it is possible to determine a display time according to character string display times in the past and determine a display time corresponding to an individual who reads a character string. In addition, in order to set a display time to a display time corresponding to an individual, who reads a character string, it is also possible to determine a display time according to operation by the individual. Since it is possible to determine a display time according to operation by the individual, it is also possible to determine a display time according to speed of reading and understanding a character string of the individual. Further, watching of elapse of the display time is stopped according to depression of one round button. Then, display is erased according to release of the round button. Consequently, the individual is capable of obtaining the display time with an extremely simple user interface. Moreover, since a character reading amount of a character string is reflected in determination of a display time, it is possible to determine a display time according to a length of a display character string, a length of a word, and the like. In other words, since it is possible to vary a display time, it is possible to determine a more suitable display time corresponding to a content of a character string.

Note that, although the determination of a display time according to a length of a word is described in this embodiment, it is also possible to determine a display time according to the number of words. More specifically, the display time determining unit 44 can determine a display time for a display character string by acquiring the number of words included in the display character string and determining a character reading amount on the basis of the acquired number of words. In this case, a value obtained by multiplying the number of words by a predetermined number may be used as a character reading amount or a weighting factor may be stored in the storing unit 52 in association with the number of words to use the weighting factor stored in association with the number of words as a character reading amount.

Consequently, since it is possible to vary a display time according to the number of words, it is possible to determine a more appropriate display time corresponding to a content of a character string.

Second Embodiment

Processing of a character string display system in accordance with a second embodiment of the invention will be hereinafter described.

A character reading amount in the second embodiment is determined in the display time determining unit 44 on the basis of the number of characters for each character type or the number of continuations for each continuation of character type or both. In this case, the display time determining unit 44 calculates a character reading amount according to the number of characters for each character type or the number of continuations for each continuation of a character type. When the character reading amount is determined on the basis of the number of characters for each character type or the number of continuations for each continuation of character type or both, the display time determining unit 44 determines the character reading amount using a weighting factor associated with the number of characters for each character type or the number of continuations for each continuation of a character type. The display time determining unit 44 multiplies weighting factors, which are stored in the storing unit 52 for respective numbers of characters for each character type and numbers of continuations for each continuation of a character type, by the numbers of characters and the numbers of continuations to set a total of the numbers of characters and the numbers of continuations multiplied by the weighting factors as a character reading amount. An example of a table storing the weighting factors is a table shown in FIG. 13. In the table shown in FIG. 13, weighting factors are stored in association with character types or continuations of character types. Then, the display time determining unit 44 reads out a weighting factor associated with a character type or a continuation of a character type with the character type or the continuation of a character type as a key. Note that the continuation of a character type means that a character type continues. The continuation may be a continuation of one time or may be continuations of plural times.

Figure 19:
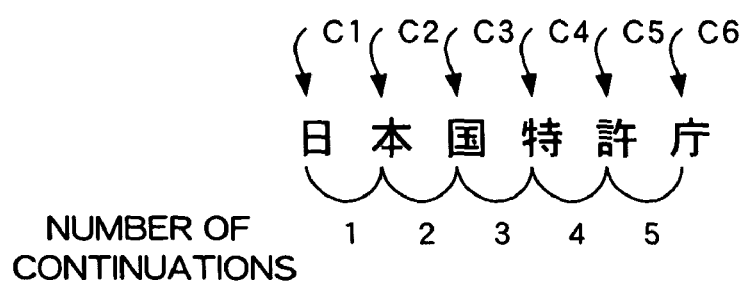
FIG. 19 is an explanatory diagram about a method of counting continuation of a character type.

Here, a method of counting the number of continuations of a character type will be described with reference to FIG. 19. In FIG. 19, a word "Japan Patent Office" in Chinese characters is shown. The number of continuations of a character type (kanji (Chinese character)) is five. In other words, the number of continuations is counted every time the character type continues such that a continuation of a character C1 and a character C2 ("Nihon") is counted as a first continuation and a continuation of the character C2 and a character C3 ("honkoku") is counted as a second continuation. In this embodiment, the number of continuations of a character type is counted in this way.

The display time determining unit 44 determines a display time for the display character string on the basis of the reference value and the character reading amount and writes the character reading amount in the storing unit 52. More specifically, the display time determining unit 44 multiplies the reference value stored in the storing unit 52 by the character reading amount to thereby determine a display time for the display character string.

Figure 10:
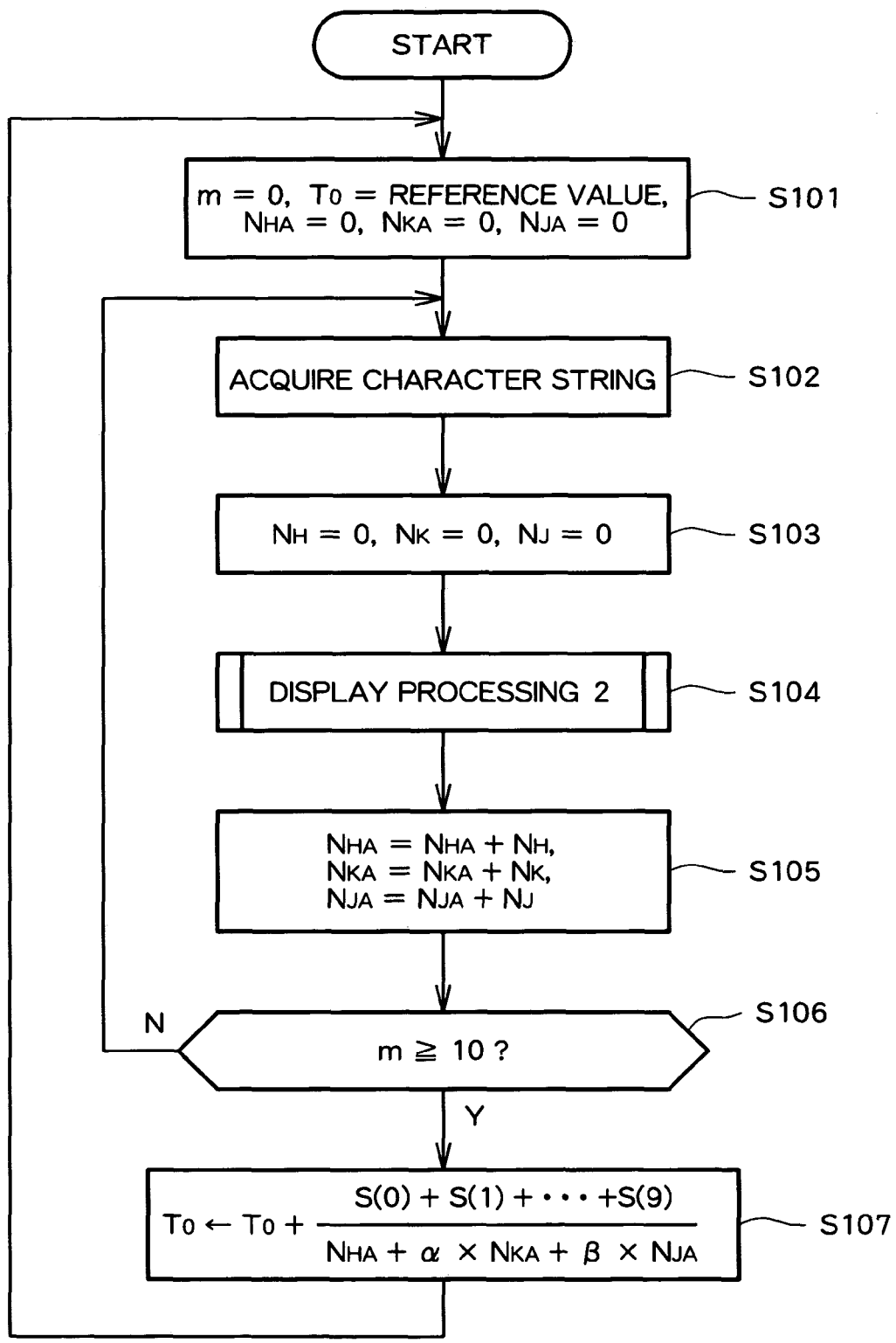
FIG. 10 is an example of a flow diagram of the computer processing.
Figure 11:
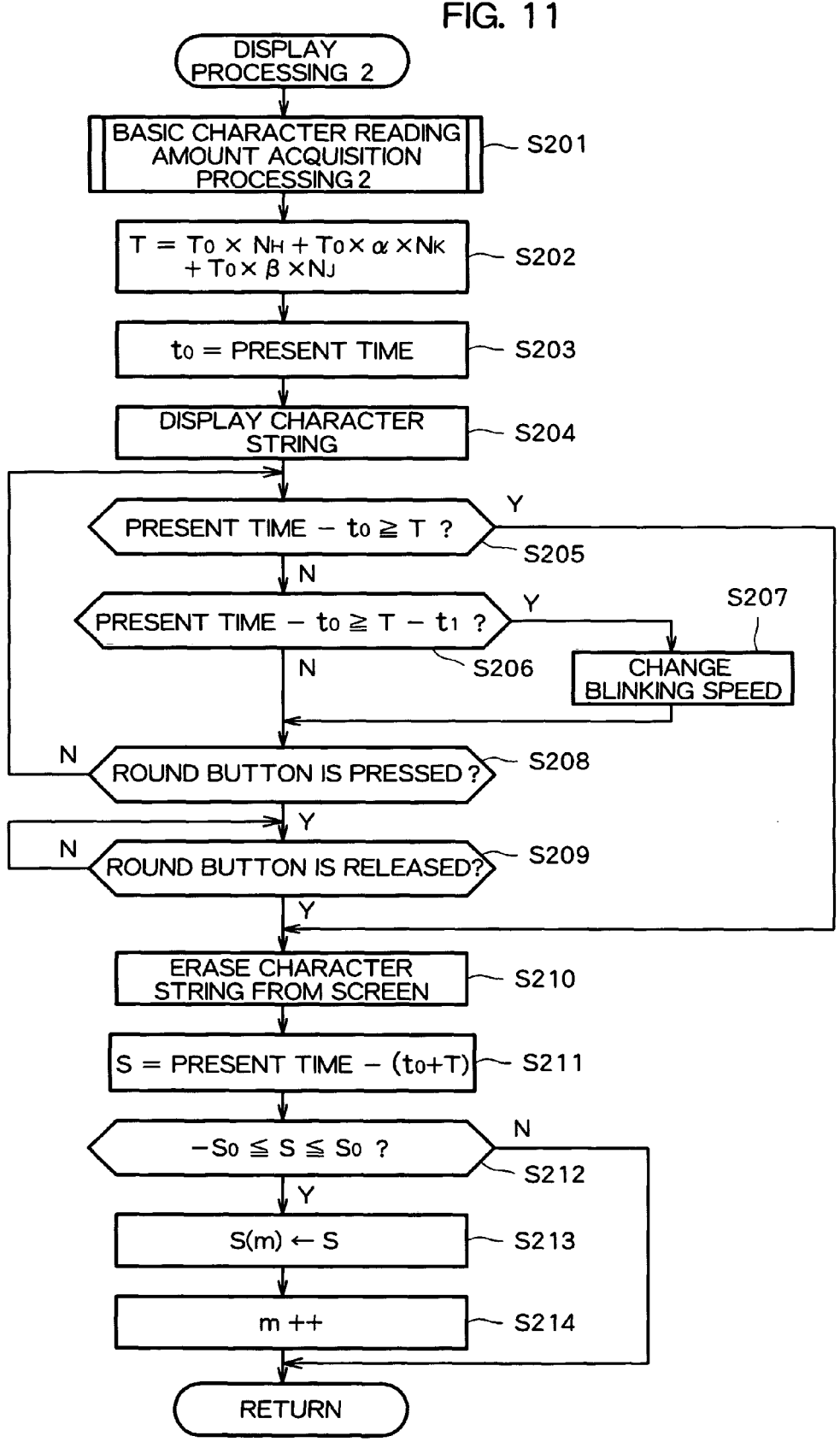
FIG. 11 is another example of a flow diagram of the computer processing.

The processing will be described more specifically on the basis of flow diagrams shown in FIGS. 10 to 12. In the figures, "kana (a Japanese system of syllabic writing)" and "kanji (Chinese character)" are used as character types and "set phrase (continuation of kanji)" is used as a continuation of a character type. In addition, a display character string is described as a sentence in which kana and kanji are mixed. However, the processing is applicable to sentences of any other languages.

In the processing shown in the figures, first, the character string display system secures storage areas for variables m, $T_0$, $N_{HA}$, $N_{KA}$, and $N_{JA}$ and sets values of the respective variables to 0, a reference value, 0, 0, 0 (S101). Next, the character string display system acquires a display character string (S102). Then, the character string display system secures storage areas for a variable $N_H$ representing the number of characters, which are not kanji, included in a character string, a variable $N_K$ representing the number of kanji included in the character string, and a variable $N_J$ representing the number of continuations of kanji included in the character string (a state in which both characters adjacent to each other are kanji) and sets values of all the variables to 0 (S103). These variables $N_H$, $N_K$, and $N_J$ are used as basic character reading amounts. Then, the character string display system performs processing for display of the display character string (S104). This processing in S104 is processing shown in FIG. 11, which will be described later. Then, the character string display system adds $N_H$, $N_K$, and $N_J$ determined in the processing in S104 to $N_{HA}$, $N_{KA}$, and $N_{JA}$ (S105). If m does not exceed 10 (No in S106), the character string display system returns to S102 and, if m is 10 or more (Yes in S106), divides a sum of S(n) by a sum R of character reading amounts shown in the following expression (3) (n is an integer equal to or larger than 0). Note that, although not specifically calculated, $N_H + \alpha \times N_K + \beta \times N_J$ is used as a character reading amount.

$$R = N_{HA} + \alpha \times N_{KA} + \beta \times N_{JA} \tag{3}$$

Then, the character string display system adds a value obtained by dividing the sum of S(n) by R to $T_0$ (S107). Here, $\alpha$ and $\beta$ are constants defined separately in advance and equivalent to weighting factors for each character type or each continuation of a character type. More specifically, $\alpha$ is a weighting factor associated with kanji and can weight an increase and a decrease in a character reading amount according to the number of kanji included in the display character string. $\beta$ is a weighting factor associated with a continuation of kanji and can weight an increase and a decrease in a character reading amount according to the number of continuations of kanji included in the display character string. Then, in order to display the next display character string, the character string display system returns to the start. In this way, the character string display system can determine a display time according to character string display times in the past by updating the reference value $T_0$.

Next, the processing shown in FIG. 11 will be described in detail. FIG. 11 is a flow diagram specifically showing the processing in S104 in FIG. 10. In the figure, first, the character string display system acquires a basic character reading amount of the display character string (S201). This processing in S201 is processing shown in FIG. 12, which will be described later. Then, the character string display system secures a display area for T and substitutes a value indicated by the following expression (4) in T (S202).

$$T = T_0 \times N_H + T_0 \times \alpha \times N_K + T_0 \times \beta \times N_J \tag{4}$$

Next, the character string display system secures a storage area for to and substitutes present time in $t_0$ (S203). Then, the character string display system displays the display character string on the monitor 18 or the like (S204). Next, the character string display system judges whether a difference between the present time and to is T or more (S205). If the difference is T or more, the character string display system erases the display character string from a screen on the monitor 18 or the like (S210). On the other hand, if the difference is not T or more, the character string display system judges whether the difference between the present time and $t_0$ is $T-t_1$ or more (S206). Here, $t_1$ is a constant defined separately in advance. If the difference between the present time and $t_0$ is $T-t_1$ or more, the character string display system changes blinking speed of a cursor displayed together with the display character string (S207). According to this processing, the character string display system can inform a person reading the display character string that the display will end soon. Then, the character string display system proceeds to processing in S208. On the other hand, if the difference between the present time and $t_0$ is not $T-t_1$ or more, the character string display system does not perform the processing in S207 and proceeds to the processing in S208. In S208, the character string display system judges whether the round button is pressed by the operator and, if the round button is not pressed, returns to S205. On the other hand, if the round button is pressed, the character string display system judges whether the round button is released by the operator (S209). Then, the character string display system repeats the processing in S209 until it is judged that the round button is released. In short, the character string display system restricts a stop of the display. In other words, the character string display system restrains the display from stopping or extends the display until the round button is released. If it is judged that the round button is released, the character string display system proceeds to processing in S210. In S211, the character string display system secures a storage area for a variable S and substitutes a value obtained by subtracting a sum of $t_0$ and T from the present time in S (S211). If S is between $-S_0$ and $S_0$ (Yes in S212), the character string display system substitutes S in a column m of an array S(n) (S213) and increments m (S214). On the other hand, if S is not between $-S_0$ and $S_0$ (No in S212), the character string display system ends the processing and returns to the processing in FIG. 10. Note that $S_0$ is a constant defined separately in advance and is a threshold value for, when there is an abnormal value in actual display data, excluding the abnormal value from determination of a display time. In addition, S is actual display time data and S(n) is an array consisting of S stored every time a character string is displayed.

Next, processing shown in FIG. 12 will be described in detail. FIG. 12 is a flow diagram specifically showing the processing for acquiring a basic character reading amount in S201 in FIG. 11. In the figure, first, the character string display system secures storage areas for i and k and substitutes 1, 0 in the respective values (S301). Then, the character string display system acquires an ith character of the display character string (S302). If the character has not been successfully acquired, the character string display system considers that the character string ends (S303), ends the processing, and returns to the processing in FIG. 11. On the other hand, if the character has been successfully acquired, the character string display system judges whether the character is a kanji (S304). If the character is a kanji, the character string display system increments $N_K$ (S305) and judges whether k is 0 (S306). If k is not 0, the character string display system increments $N_J$ (S307) and proceeds to processing in S308. On the other hand, if k is 0, the character string display system does not increment $N_J$ and proceeds to processing in S308. Then, the character string display system increments i (S311), returns to the processing in S302, and acquires the next character. If the character is not a kanji in S304, the character string display system increments $N_H$ (S309), substitutes 0 in k (S310), increments i (S311), returns to the processing in S302, and acquires the next character.

According to this embodiment, it is also possible to determine a display time according to character string display times in the past and determine a display time corresponding to an individual who reads a character string. In addition, in order to set a display time to a display time corresponding to an individual who reads a character string, it is also possible to determine a display time according to operation by the individual. Since it is possible to determine a display time according to operation by the individual, it is also possible to determine a display time according to speed of reading and understanding a character string of the individual. Further, watching of elapse of the display time is stopped according to depression of one round button. Then, display is erased according to release of the round button. Consequently, the individual is capable of obtaining the display time with an extremely simple user interface. Moreover, since a character reading amount of a character string is reflected in determination of a display time, it is possible to determine a display time according to a length of a display character string, the number of kanji, the number of set phrases, and the like. In other words, since it is possible to vary a display time, it is possible to determine a more suitable display time corresponding to a content of a character string.

Note that the invention is not limited to the embodiments described above.

For example, a character string display system 70 for character string display shown in FIG. 14 may be used as the character string display system. As shown in the figure, this character string display system 70 includes a server computer 74 and at least one computer 10. Both of these components are connected to a communication network 72 so as to be capable of exchanging data. The server computer 74 is used as a chat server, an information delivery server, a game server, and the like and has the same structure as the computer 10 shown in FIG. 1.

In the character string display system 70, the communication unit 24 of the computer 10 is connected to the communication network 72 as shown in FIG. 14. The communication unit 24 receives character strings, display times, and the like from the server computer 74 and the other computers 10 and outputs the same to the CPU 14 via the input/output processing unit 22. In addition, the communication unit 24 also transmits character strings, display times, and the like to the server computer 74 and the other computers 10 in accordance with input from the input/output processing unit 22. Note that this communication unit 24 also performs usual processing corresponding to a mail service, a WWW service, a network game service, a telephone service, an information delivery service, and the like that are provided via the communication network 72.

Figure 15:
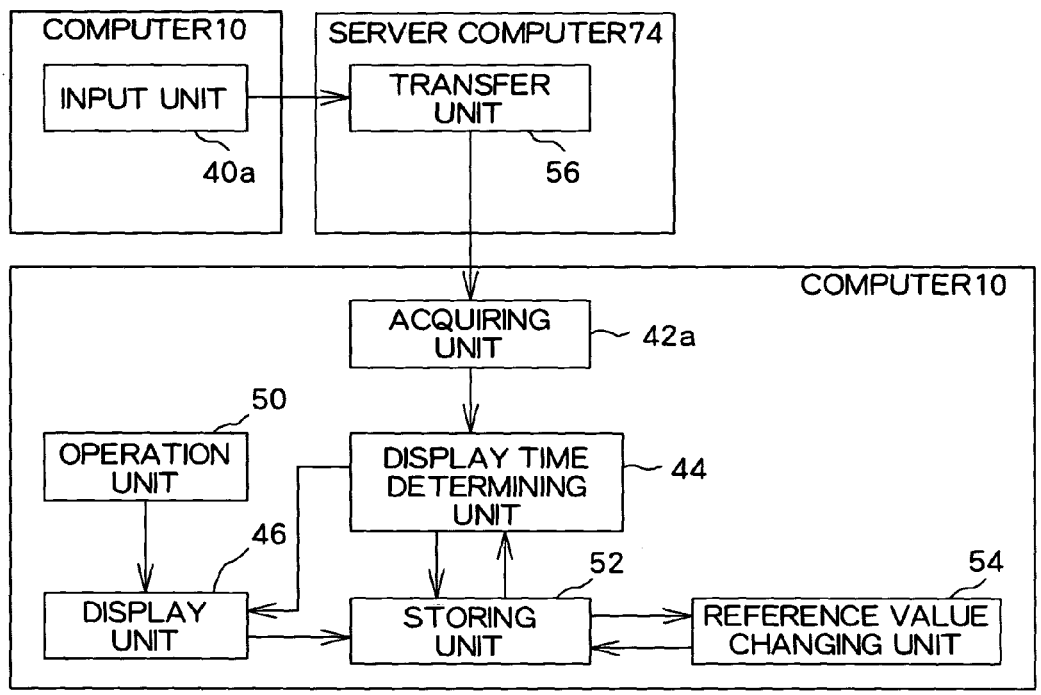
FIG. 15 is an example of a block diagram of a structure of a server computer and a computer.

FIG. 15 shows a functional block diagram of the computer 10-1, the computer 10-2, and the server computer 74. An input unit 40a is provided in the computer 10-1. A transfer unit 56 is provided in the server computer 74. An acquiring unit 42a, the display time determining unit 44, the display unit 46, the operation unit 50, the storing unit 52, and the reference value changing unit 54 are provided in the computer 10-2.

In the input unit 40a, instead of means for inputting a character string to the acquiring unit 42, transfer means for transferring the character string to the transfer unit 56 is added. The character string to be transmitted at this point is included in, for example, an IP packet on a LAN or a WAN that have been publicly known conventionally. In addition, the input unit 40a is constituted to input characters in order, for example, from the keyboard 26 to thereby input a character string. Alternatively, it is also possible to constitute the input unit 40a with the microphone 34 and software for converting a speech inputted by the microphone 34 into a character string. Moreover, it is also possible to display all characters on the monitor 18 in advance and designate the characters in order with a pointing device such as the controller 28 or the mouse 29 on the monitor 18 to thereby input a character string. Besides, it is also possible that a character string is stored in a computer program such as a game program or various storage media, which are constituted as a database or a table, in advance and the computer 10-1 automatically reads out the character string in accordance with a description of the computer program.

The transfer unit 56 receives a character string from the input unit 40a and transmits the character string to the computer 10-2. The character string transmitted at this point is included in, for example, an IP packet on a LAN or a WAN that have been publicly known conventionally. The transfer unit 56 determines the computer 10-2 to be a transmission destination. Alternatively, the computer 10-2 is designated by not-shown means from the computer 10-1 having the input unit 40a.

In the acquiring unit 42a, instead of means for inputting a character string from the input unit 40, means for receiving the character string from the transfer unit 56 is added.

Figure 16:
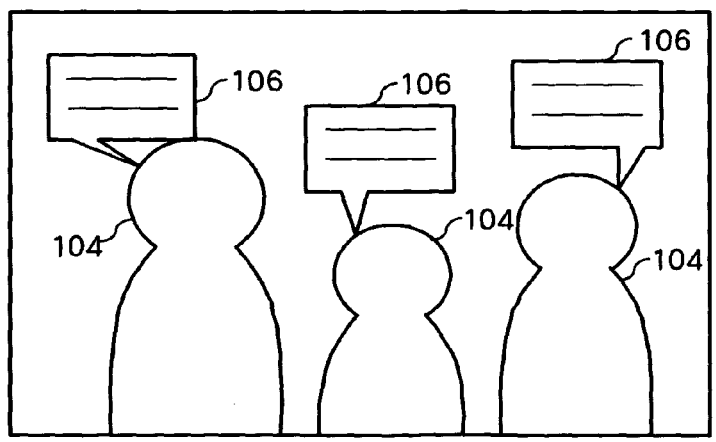
FIG. 16 is an example of a screen displayed on a display of a computer.

FIG. 16 shows an example of a screen displayed in the computer 10 including the display unit 46 in the character string display system 70. The figure shows an example in the case in which the computer 10 is used as a game machine and the server computer 74 is used as a game server. More specifically, at least one computer 10 executes a game program for a network game, establishes a two-dimensional or three-dimensional game space on a memory, and displays a state of the game space on the monitor 18 of the computer 10 itself. In addition, the computer 10 transmits a state of the game to the server computer 74 as game state data and transmits a character string inputted from the input unit 40a included in the computer 10 to the server computer 74. Here, the game state data refers to data, which is required in the network game, such as states of characters 104 like costumes and facial expressions of the characters 104. The server computer 74 transmits the game state data and a character string, which are transmitted from the at least one computer 10, to at least one computer 10 different from the computer 10 that has transmitted the game state data and the character string. The computer 10, which has received the game state data and the character string, determines a display time for the character string and reflects the game state data and the character string on a game space to be established on the memory. In this way, the respective computers 10 can share a game space established on the memory and a character string displayed on the game space. FIG. 16 shows an example of a display screen in the computer 10 executing such a network game. Character strings are displayed in lines 106 together with pictures of the characters 104 that change on the basis of the game state data. The character strings disappear from the screen when a display time elapses. Alternatively, when players of the game, who are operators, perform predetermined operation in the operation unit 50, character strings are displayed in accordance with the operation. Then, a reference value is changed on the basis of a time, during which the character strings are displayed, and a character reading amount of the character strings, whereby character strings are displayed on the monitor 18 of the computer 10 in a time more suitable for the respective players.

Figure 17:
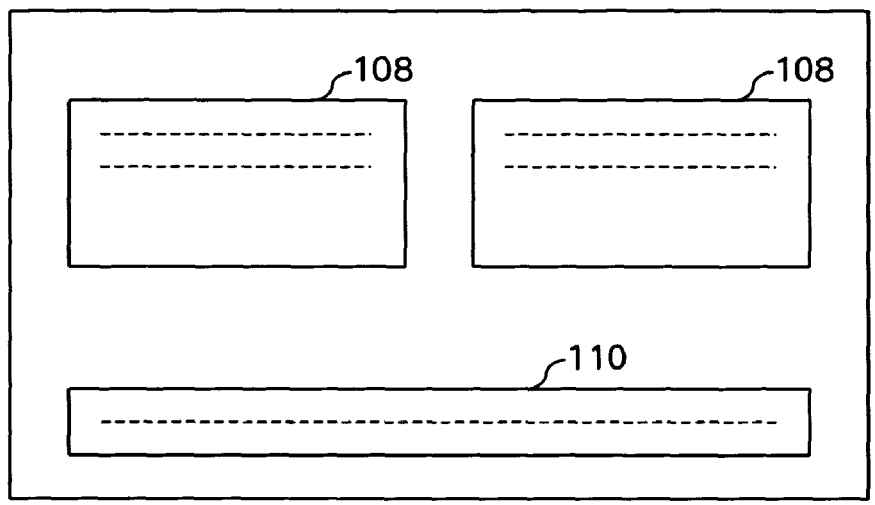
FIG. 17 is an example of a screen displayed on the display of the computer.

FIG. 17 shows another example of the screen displayed in the computer 10 including the display unit 46 in the character string display system 70. The figure shows an example in the case in which the server computer 74 is used as a chat server. More specifically, plural computers 10 transmit and receive a character string via the server computer 74. The computer 10, which has received the character string, calculates a display time. Then, the computer 10 displays the character string on the monitor 18 for the calculated display time. A computer user, who uses the computer 10, inputs a character string in a character input space 110 in accordance with the display. In this way, the character string display system 70 functions as a server type chat system or the like that allows users to interact with one another using character strings on a real time basis. FIG. 17 shows an example of a display screen in the computer 10 executing such a chat. As in the case of the network game system in FIG. 16, character strings indicating remarks of interaction partners are displayed and disappear when a display time elapses.

Figure 18:
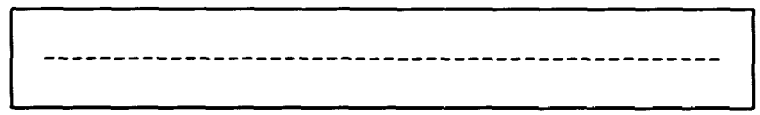
FIG. 18 is an example of a screen displayed on the display of the computer.

FIG. 18 shows still another example of a screen displayed in the computer 10 including the display unit 46 in the character string display system 70. The figure shows an example in the case in which the server computer 74 is used as an information delivery server and the computer 10 is used as an electronic sign board. More specifically, the information delivery server transmits a character string to the computer 10, and the computer 10 having received the character string calculates a display time. Then, the computer 10 can inform a person watching the electronic sign board of information by displaying the character string on the monitor 18 for the calculated display time. FIG. 18 shows an example of a display screen in the computer 10 in such an information delivery system. A character string is displayed on the screen and disappears when a display time elapses.

Note that, for example, in FIG. 15, the server computer 74 does not have to be used. In this case, a character string is transmitted from the input unit 40a to the acquiring unit 42a in FIG. 15 directly. The computer 10 having the input unit 40a determines the other computer 10 to be a communication destination using not-shown means.

Figure 12:
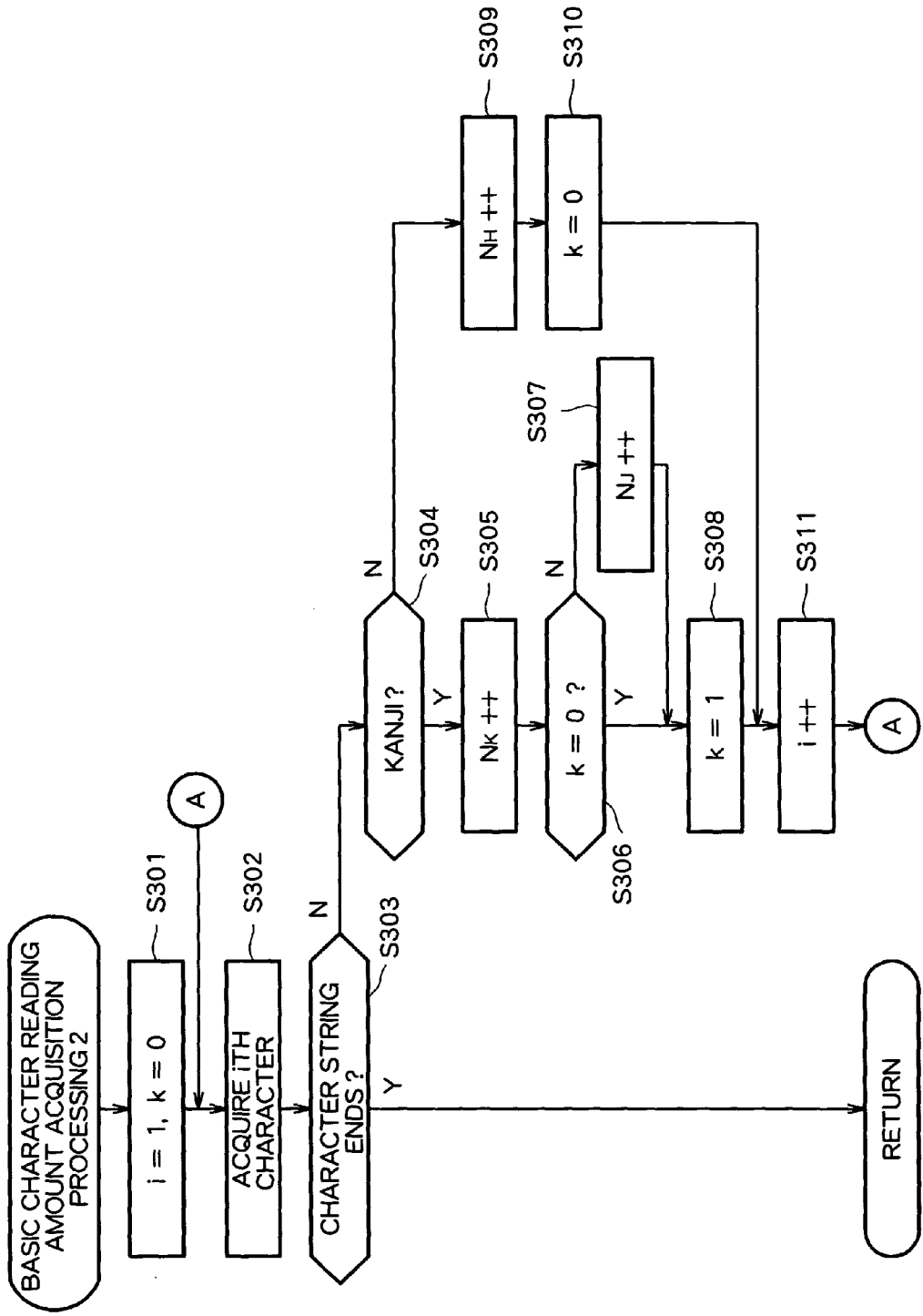
FIG. 12 is a further example of a flow diagram of the computer processing.

In the flow shown in FIG. 12, "kana" and "kanji" are used as character types and "set phrase (continuation of kanji)" is used as a continuation of a character type. However, for example, other character types such as "alphabet" and other continuations of a character type such as "English word" may be used. It is needless to mention that only a character type or only a continuation of a character type may be used. Alternatively, a reference value may be changed on the basis of only extension and reduction of a display time according to operation without using both a character type and a continuation of a character type. In this case, the character string display time determining unit determines a reference value directly as a time during which a character string is displayed.

In storing a character reading amount in the storing unit 52, the reference value changing unit 54 may delete or overwrite a value that the reference value changing unit 54 used in changing a reference value or may continue to store the value. In storing a difference between a time, during which a character string has been actually displayed, and a display time determined by the display time determining unit 44 in the storing unit 52, the reference value changing unit 54 may delete or overwrite a value that the reference value changing unit 54 used in changing a reference value or may continue to store the value. The reference value changing unit 54 may change the reference value every time a new value is stored or may change the reference value after values are stored n times. The reference value may be changed on the basis of data indicating an extended or reduced time or may be changed on the basis of a fixed value not related to the extended or reduced time.

In the character string display system 70, when the server computer 74 acquires a display character string, the server computer 74 may calculate a character reading amount of the display character string and transmits the character reading amount to the computer 10 together with the display character string. In this way, the computer 10 can determine a display time promptly by multiplying the received character reading amount by a reference value. If a database storing reference values corresponding to respective users or the respective computers 10 is provided in the server computer 74, the server computer 74 can determine a display time for a display character string for each of the users or each of the computers 10. Then, if the server computer 74 transmits the determined display time to the computer 10 together with the display character string, the server computer 74 can display the display character string in the display time corresponding to the user or the computer 10. In this way, it is possible to reduce processing in the computer 10.

In the second embodiment, in a sentence of a language that does not use both a predetermined ideogram character group such as kanji and a predetermined phonogram character group such as kana and hankul but uses only a phonogram character group, $N_K$ and $N_J$ are always 0. A character reading amount may be calculated according to only the number of characters included in a display character string. Conversely, in the case of a language that uses only an ideogram character group such as Chinese, the character string display system may always proceed to the processing in S309 without judging whether a character is a kanji in S304.

What is claimed is:

1. A character string display system comprising:
    a reference value storing unit for storing a reference value for determining a display time for character string
    a display character string acquiring unit for acquiring a display character string;
    a character reading amount determining unit for determining a character reading amount of the display character string on a basis of a content of the display character string;
    a display character string display time determining unit for determining a display time for the display character string on the basis of the reference value stored by the reference value storing unit and the character reading amount determined by the character reading amount determining unit;
    a display character string display unit for displaying the display character string for the display time determined by the display character string display time determining unit;
    an operation detecting unit for detecting a predetermined operation performed by an operator while the display character string display unit displays the display character string;
    a display character string display time extending/reducing unit for extending or reducing a time, during which the display character string display unit displays the display character string, when the operation detecting unit detects the predetermined operation by the operator; and
    a reference value changing unit for changing the reference value stored by the reference value storing unit on a basis of the extended or reduced display time by the character string display time extending/reducing unit and the character reading amount determined by character reading amount determining unit.

2. A character string display system according to claim 1, wherein, when the operation detecting unit detects the predetermined operation by the operator, the display character string display time extending/reducing unit extends or reduces the time, during which the display character string display unit displays the display character string, according to a content of the operation by the operator.

3. A character string display system according to claim 2, wherein, when the operation detecting unit detects depression of a predetermined button, the display character string display time extending/reducing unit restricts a stop of display and, when the operation detecting unit detects release of the predetermined button, the display character string display time extending/reducing unit stops the display to thereby extend or reduce the time during which the display character string display unit displays the display character string.

4. A character string display system according to claim 1 or 3, further comprising;
    an extended/reduced time data storing unit for storing data corresponding to the display time extended or reduced by the display character string display time extending/reducing unit, wherein the reference value changing unit changes the reference value stored by the reference value storing unit on the basis of the data stored by the extended/reduced time data storing unit and the character reading amount determined by the character reading amount determining unit.

5. A character string display system according to claim 4, wherein
    the reference value is a display time for the display character string per the character reading amount.

6. A character string display system according to claim 5, wherein the character reading amount determining unit determines the character reading amount on the basis of lengths of words included in the display character string.

7. A character string display system according to claim 5, wherein the character reading amount determining unit determines the character reading amount on the basis of the number of the words included in the display character string.

8. A character string display system according to claim 5, wherein the character reading amount determining unit determines the character reading amount on the basis of the number of characters for each character type included in the display character string or the number of continuations for each continuation of the character type.

9. A character string display method comprising:
    acquiring a display character string;
    determining a character reading amount of the display character string on a basis of a content of the display character string;
    determining a display time for the display character string on a basis of a reference value stored in a reference value storing unit and the determined character reading amount;
    displaying the display character string for the determined display time;
    detecting predetermined operation performed by an operator while the display character string is displayed;
    extending or reducing a time, during which the display character string is displayed, when the predetermined operation by the operator is detected; and
    changing the reference value stored in the reference value storing unit on a basis of the extended or reduced time and the determined character reading amount.

10. A computer readable storage medium having stored therein a program for causing a computer to function as:

a reference value storing unit for storing a reference value for determining display time for character string;

a display character string acquiring unit for acquiring a display character string;

a character reading amount determining unit for determining a character reading amount of the display character string on the basis of a content of the display character string a display character string display time determining unit for determining a display time for the display character string on the basis of the reference value stored by the reference value storing unit and the character reading amount determined by the character reading amount determining unit;

a display character string display unit for displaying the display character string for the display time determined by the display character string display time determining unit;

an operation detecting unit for detecting predetermined operation performed by an operator while the display character string display unit displays the display character string;

a display character string display time extending/reducing unit for extending or reducing a time, during which the display character string display unit displays the display character string, when the operation detecting unit detects the predetermined operation by the operator; and a reference value changing unit for changing the reference value stored in the reference value storing unit on a basis of the display time extended or reduced by the character string display time extending/reducing unit and the character reading amount determined by character reading amount determining unit.

* * * * *